March 14, 1961 H. D. FOWLER 2,974,899
SINGLE PROPELLER CONVERTIBLE VTOL AIRCRAFT
Filed Jan. 9, 1958 2 Sheets-Sheet 1

INVENTOR.
HARLAN D. FOWLER
BY
ATTORNEYS

March 14, 1961 H. D. FOWLER 2,974,899
SINGLE PROPELLER CONVERTIBLE VTOL AIRCRAFT
Filed Jan. 9, 1958 2 Sheets-Sheet 2

INVENTOR.
HARLAN D. FOWLER
BY
*Matthew Edwards*
ATTORNEYS

United States Patent Office 2,974,899
Patented Mar. 14, 1961

2,974,899
SINGLE PROPELLER CONVERTIBLE VTOL AIRCRAFT

Harlan D. Fowler, Longmont, Colo.
(P.O. Box 304, Burlingame, Calif.)

Filed Jan. 9, 1958, Ser. No. 707,880

7 Claims. (Cl. 244—12)

This invention relates to a vertical take-off and landing airplane, and more particularly to a single propeller (convertible) airplane for vertical take-off and landing and for conventional flight.

A number of convertible, vertical take-off and landing (commonly designated VTOL) airplanes have been proposed in the past, and these include airplanes having an engine with two or more traction propellers in which the slipstream may be directed from a horizontal to a vertically downwardly position to achieve a vertical thrust sufficient for vertical take-off and landing. For a vertical take-off and landing airplane, its propellers must produce a high static thrust in order to achieve a force greater than the weight of the airplane to thereby produce vertical movement. This high static thrust system involves a high torque, and to date the means for overcoming the torque has been the use of two propellers, generally driven by one engine. In general, the two propeller system uses counter-rotating propellers opposing each other and substantially cancelling out the torque.

In convertible airplanes, some means must be provided for changing the direction of the slipstreams of the propellers from a horizontal to a vertically downwardly direction to achieve a vertical force. In some cases the wing supporting the engines and propellers is tilted vertically and after achieving the desired height, the wing is slowly turned to the horizontal position and the airplane is converted to a conventional flight. In other types, large flaps have been used for deflecting the slip stream downwardly.

Accordingly to the present invention, I have provided a convertible, VTOL single propeller airplane which includes a fixed airfoil and a fixedly mounted engine. The airplane includes means for deflecting the slipstream of the propeller downwardly to produce an upward force for achieving vertical movement. The deflection means includes the flexible curtain system described in my copending application Serial No. 665,693 for a Drag Regulator for Convertible Aircraft filed June 14, 1957. To overcome the torque forces produced by the high static thrust propeller, opposing wing tip jets are provided which produce lateral stability and control of the airplane during vertical takeoff and landing motions, and further aids in lateral stability of the airplane in conventional flight and through the transition from vertical movements to conventional flight. By providing at least one controllable jet on the wing tips, a supplementary power aid is added to the manual roll control. Normally for small airplanes, a direct linkage is used from the control stick or column to the ailerons, whereas the controllable jet supplements the force required to roll the airplane when there is no forward velocity to activate the ailerons.

An important object of the invention is to provide an effective and automatic torque control system for a single, high thrust propeller airplane.

Another important object of the invention is to provide a single propeller deflected slipstream convertible VTOL airplane.

Another object of the invention is to provide a single propeller convertible airplane having wing tip jet pressure means for controlling lateral stability during vertical take-off and landing operation, and aid control of the airplane through low air speed transitions.

A still further object of the invention is to provide additional surface to the lower airfoil, for reducing the wing loading on the heavily loaded central cellule during transition through the low speed regime from vertical take-off and landing position to cruise flight, and from cruise through the low speed transition to vertical movement.

A still further object of the invention is to provide a jet pressure means arranged at the wing tips of the single engine airplane to counteract the torque of a single propeller and simultaneously to aid in the roll of the aircraft.

Another object of the invention is to provide a controllable pressure jet at the wing tips of a single propeller airplane for aiding lateral stability of the airplane during vertical movement without horizontal movement, and in conventional flight to aid in the roll control of the airplane.

A still further object of the invention is to provide a single propeller convertible airplane having a high degree of visibility, and a high degree of maneuverability from hovering to full conventional flight.

These and other objects and advantages of the invention may readily be ascertained by referring to the following description and appended illustrations in which:

Figure 4 is a side elevational, cross-sectional view of a controllable pressure wing tip jet; and Figure 5 is an end elevational cross-section of the device of Fig. 4.

Figure 1:
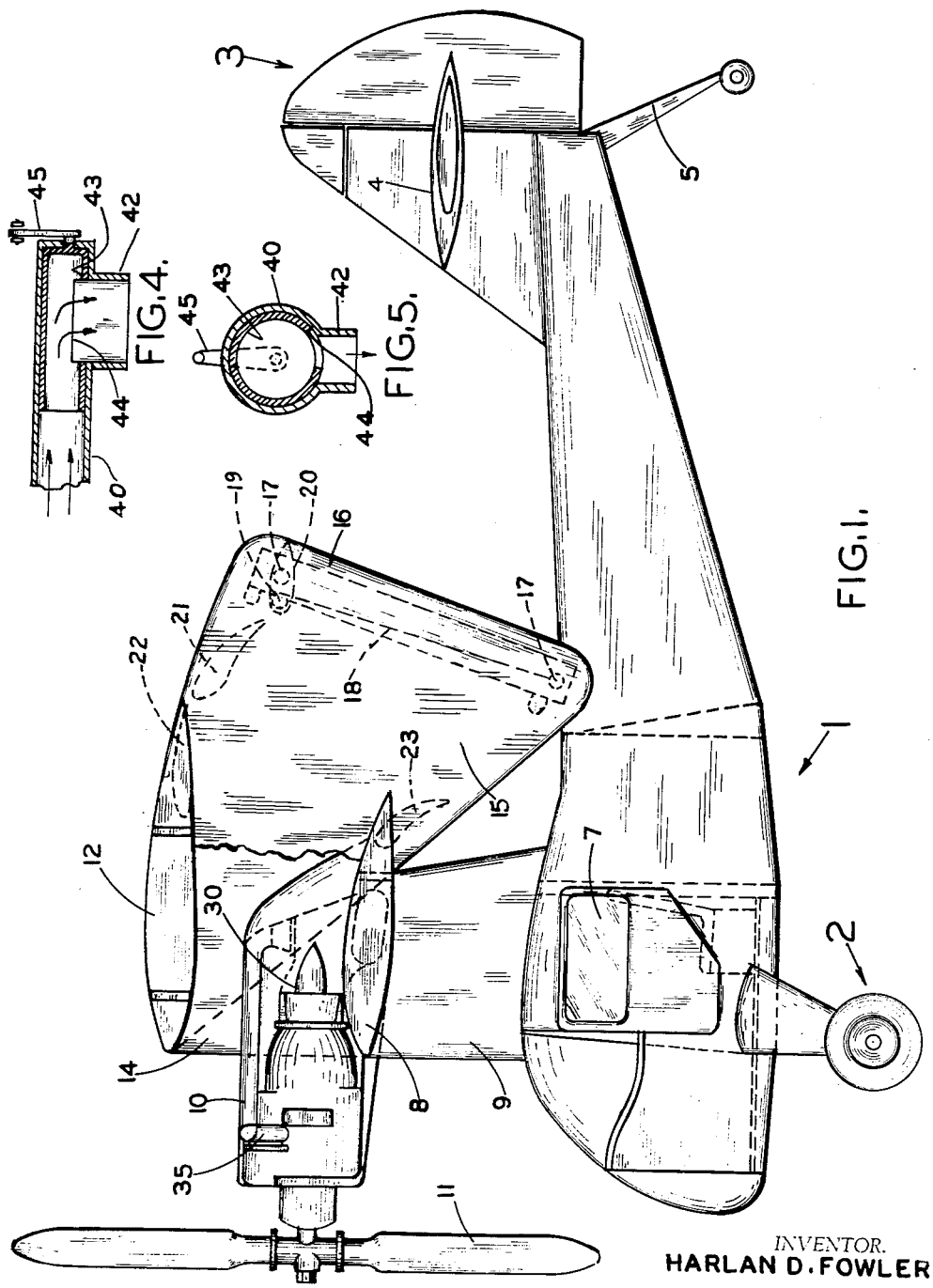
Figure 1 is a side elevational view of a convertible, single propeller VTOL airplane, showing various positions of the control elements for various types of flight.

In general, the airplane of my invention is a high wing monoplane having a single engine and a single tractor propeller mounted on the high wing. An upper stub wing mounted above the high wing and enclosed in end plates is arranged with a flexible curtain mount and flaps for deflecting an effective portion of the slipstream of the propeller into a generally vertically downward direction. In one preferred form, the engine of the airplane is a turbine jet engine (commonly referred to as a turbo-prop) having a high thrust propeller mounted thereon, and ducts are provided through the long high wing from the engine exhaust to pressure jet discharge at the wing tips. An engine driven compressor may be provided to supplement the exhaust thrust at the jet discharges.

In the airplane illustrated in the drawings, there is included a fuselage shown by the general numeral 1, which includes a pilot's compartment 7, a landing gear 2 and an empennage assembly 3. The empennage includes a full movable horizontal stabilizer and elevator 4, such as is well known in the art. A tail wheel assembly 5 is provided with a long strut to hold the plane tail high so that the propeller will provide a thrust which is substantially horizontal with the craft at rest. The pilot's compartment 7 is mounted in the usual position, and it is arranged with adequate controls, not illustrated. A high wing or airfoil 8, mounted on upright struts 9, extends laterally from the fuselage toward both sides, as is common practice. An engine 10 is mounted on the wing 8 generally centrally of the wing and the struts 9, and it extends forwardly from the wing to permit operation of a high static thrust propeller 11. High static thrust, variable pitch propellers are well known in the art and it is not believed that detailed description is necessary. Such a propeller may be modified to comprise the design between high efficiency high speed propellers and the high static thrust propellers. A high stub-wing 12 is mounted on upper struts 14, positioning the stub-wing centrally above the airfoil 8. A flexible curtain, slipstream deflector is mounted on essentially streamlined end plates 15 extending rearwardly and downwardly of the stub-wing 12 and the main wing 8. The deflector includes uprights 16 and a rod 17 on which a flexible curtain 18 is mounted. The flexible curtain is arranged to be rolled up on the roller 19 enclosed in horizontal strut 20, or extended therefrom, and a mechanism controllable by the pilot operates the device much in the manner of a common household curtain. The details of this slipstream deflector are described in my co-pending application Serial No. 665,693. A Fowler flap 21 is arranged to move rearward from its position in the stub-wing (position indicated at 22) into the space between the trailing edge of the stub-wing and the deflector 18 to aid in deflecting the slipstream and to permit a small amount of the slipstream velocity to pass through the opening providing an air stream over the empennage. This aids in airplane control during VTOL movements. In conventional flight the curtain 18 is retracted into the horizontal strut 20 presenting a full, unobstructed opening which permits air to pass in conventional manner around the stub-wing 12 and the main airfoil 8 providing additional lift to the empennage and for control thereof. The inner portion or central biplane cellule (considered the space bounded by the main airfoil 8, the stub-wing 12, the end plates 15 and curtain 18) includes an additional flap 23 which extends downwardly to aid in the deflection of the slipstream.

The engine 10 includes an exhaust discharge 30, which is well known on such turbine type engines. The discharge is divided and directed into a duct 31 leading to the right wing tip and a duct 32 leading to the left wing tip. The ducts are mounted internally in the wing 8, and are suitably insulated to prevent burning by the heat of the gases passing through the ducts. The duct 31 terminates at the right wing tip in a downwardly directed jet exhaust 33, and the duct 32 terminates in an upwardly directed jet exhaust 34 on the opposite wing tip. These ducts are directed substantially perpendicularly to and spaced from the roll axis of the airplane. This arrangement is to counteract the torque, and where the propeller rotation is reversed, the discharges must, obviously, be reversed. A turbine compressor 35 having a discharge duct 36 discharges into the two ducts 31 and 32 and supplements the exhaust gases from the turbine engine to increase the thrust from the wing tip jets so as to achieve the required torque counteracting force. The necessary thrust is determined by the distance 37 that the jets are spaced from the longitudinal center or roll axis of the craft.

Fuel for the engine is supplied by a tank (not shown) in the upper stub-wing 12 and by a fuel tank in wing 8, in accordance with known methods.

Figure 2:
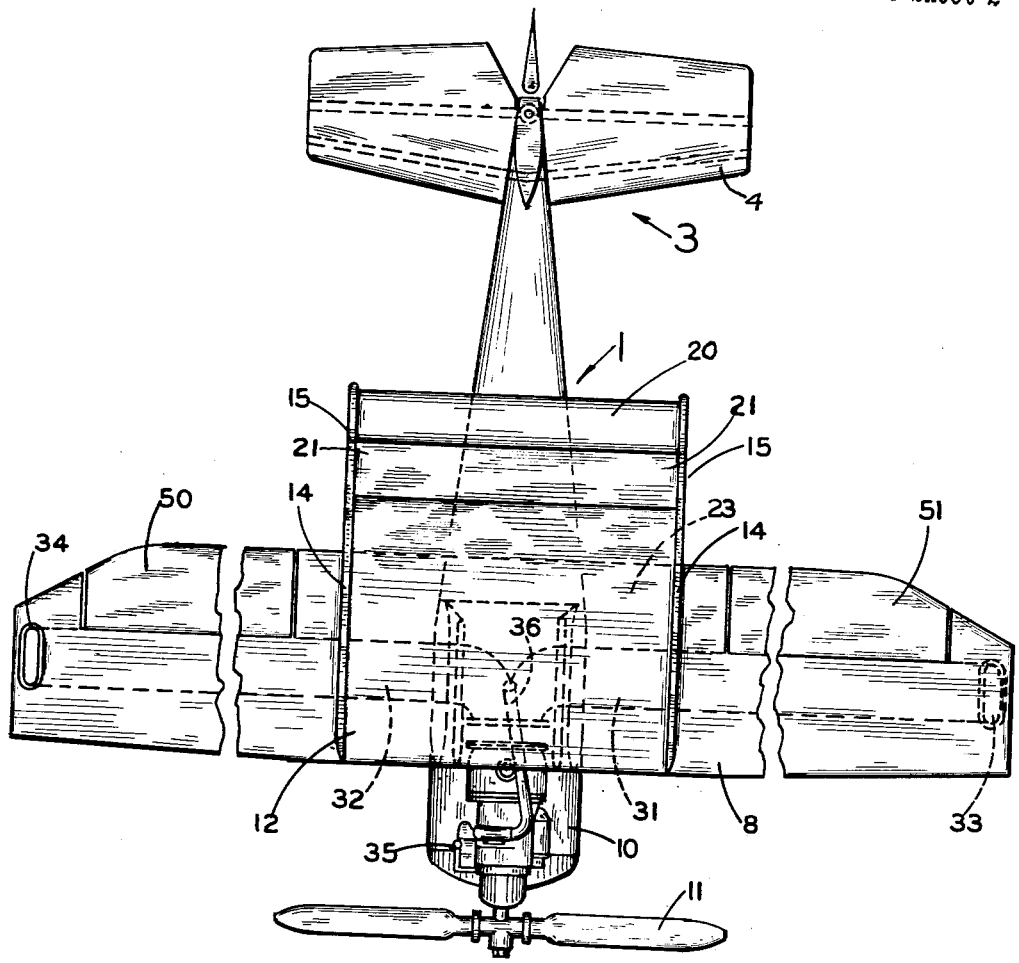
Figure 2 is a top plan view of the single propeller airplane illustrated in Fig. 1 showing a system for wing tip jet control.
Figure 3:
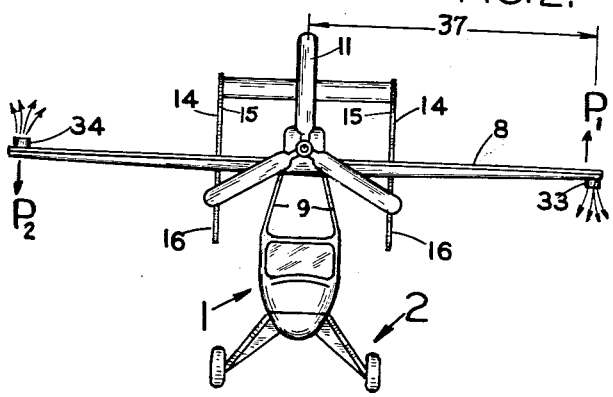
Figure 3 is a front elevational view, in reduced scale, of the airplane of Fig. 1.

By controlling the area of outlet of each jet discharge, the required thrust at the jet discharge may be controlled. In Fig. 4 a controlled outlet jet discharge is illustrated which includes a duct 40 having a discharge 42. A sleeve valve 43 having a slit or opening 44 therein of substantially the same size as the opening of the discharge 42 is mounted internally of the duct 40. A control lever 45 is interconnected with the sleeve valve 43, is arranged to rotate the same in the duct 40 so as to vary the effective opening of the discharge 42. As shown in Fig. 5, the sleeve valve is turned in such a manner that the opening into the discharge 42 is closed by about one-fourth of the total opening, leaving an effective opening of about three-fourths of the total. In this position the discharge is at normal pressure. By rotating the sleeve valve 43 counterclockwise, the opening to the discharge 42 is further closed and a decrease in effective jet thrust results. By rotating the sleeve clockwise, the opening 44 and the sleeve valve 43 may be made to register providing a full opening and a resulting increase of thrust. The control lever 45 may be interconnected with the controls of conventional ailerons 50 and 51, Fig. 2, so that in any rolling movement tendency of the airplane the jet thrust on one side or both sides may be reduced or increased, as the case may be, to utilize the jet thrust to restore normal lateral equilibrium. Thus a power-actuated control for roll is provided.

One effective airplane has a fuselage length of nineteen feet seven inches and a main wing span of twenty-three feet. A gas turbine turboprop engine for use with this aircraft is a French engine called "Artouste II" commonly known as a T–51 engine. A nine foot two inch diameter, three blade propeller is utilized. The engine produces about 400 horsepower, which is sufficient to provide the required high static thrust of the propeller and produces a torque of about 1400 foot-pounds. Under these conditions the jet thrust P–1 and P–2 from the wing tip jets is about 63 pounds, which at the ends of the wing is sufficient to counteract the torque of the engine.

For vertical take-off and landing the slipstream deflector curtain 18 is moved to the down position covering the space from the streamline strut 20 at top to just above the top of the fuselage indicated by the dashed line rod 17. The Fowler flap 21 is moved back to close the cellule and the flap 23 is turned downwardly opening the throat between the curtain and the wing to permit the slipstream to pass freely between the wing and the deflector. After the engine has been warmed up and has moved to full power, the upward thrust of deflected slipstream moves the airplane upwardly. On ascent and descent the wing tip jets provide lateral stability during the periods when little or no air stream is passing over the ailerons. Since the jets are interconnected with the ailerons, normal pilot reaction to roll in stick movement against the roll controls the valves of the jets to change the pressure and causing the plane to react in the desired manner. On achieving the desired altitude, the slipstream deflector 18 and the flaps 21 and 23 are slowly moved into normal position and the airplane assumes conventional flying characteristics as it moves forwardly through the air to where it has sufficient forward speed for conventional flight.

The wing area between the upright supports 14 holding the stub-wing 12 and end plates 15 connecting to lower wing 8 may be considered to be positioned in a central biplane cellule through which the slipstream is confined and deflected. During the transition through low air speed ranges from vertical maneuvers to conventional flight and vice versa, the wing loading in this area is generally very high. By lengthening the main wing 8 laterally from this central cellule, the wing area is increased, thereby decreasing the overall wing loading and permitting safe transition through the low air speed ranges. This additional wing area provides a high margin of safety in the event of engine failure during the transition or during vertical take-off and loading maneuvers.

The conversion of the airplane from conventional cruise to a vertically movable airplane is simply done by reducing the engine power to slow the craft to a safe speed so that the flaps and the slipstream deflector may be lowered. As the flaps and the deflector are lowered, the power of the engine must be increased to overcome the high drag caused by the deflector. By the time the deflector is fully extended and the flaps are fully down, the forward speed of the airplane should be substantially zero, and the airplane is sustained in the air by the downwardly directed slipstream from the propeller. By varying the power of the propeller, vertical movement of the airplane is achieved.

While the invention has been illustrated with reference to a specific embodiment, there is no intent to limit the spirit and scope of the invention to the precise details so set forth, except insofar as defined in the following claims.

I claim:

1. In a single propeller convertible airplane, at least one airfoil mounted for conventional flight, means supported by said airfoil for selectively deflecting the propeller slipstream from a generally horizontal to a generally vertical downwardly direction, means inclusive of an air compressor associated with the engine of said airplane and arranged for mixing with engine exhaust for producing a high velocity stream of gas, duct means mounted internally of the airfoil and extending from the airplane engine to each tip of the airfoil, and vertically directed, opposed gas discharge means mounted adjacent each airfoil tip directed in opposed, generally vertical directions and perpendicularly to the roll axis of the airplane to substantially counteract the torque of the airplane engine.

2. A vertical take-off and landing convertible airplane comprising a passenger carrying fuselage having ground resting members arranged to hold the fuselage at rest in a generally horizontal position, an empennage mounted on the fuselage arranged for conventional flight, a long span airfoil mounted above the fuselage and arranged for conventional flight, turbo-prop engine means mounted on said airfoil and arranged to actuate a single, high torque, tractor propeller, an upper stub airfoil and end plates supported by said airfoil in direct slipstream alignment, slipstream deflecting means mounted supported rearwardly and downwardly of said stub airfoil and arranged to move from a closed, conventional flight position where the slipstream passes in general alignment with both said airfols to an extended position generally perpendicular to the slipstream and arranged to deflect an effective portion of the slipstream downwardly across said fuselage and adjacent the center of gravity thereof, and means inclusive of a gas duct and opposed wing tip discharge means enclosed within said airfoil for counteracting torque and provide lateral stability during vertical take-off and landing movements and the transition during low air speed ranges.

3. A vertical take-off and landing convertible airplane comprising a passenger carrying fuselage having ground resting members arranged to hold the fuselage at rest in a generally horizontal position, an empennage mounted on the fuselage arranged for conventional flight, a long span airfoil mounted above the fuselage and arranged for conventional flight, engine means mounted on said airfoil and arranged to actuate a single tractor propeller, an upper stub airfoil and end plates supported by said airfoil in direct slipstream alignment, slipstream deflecting means inclusive of a retractible curtain depending rearwardly and downwardly from said stub airfoil and arranged to move from a closed conventional flight position where the slipstream passes generally aligned over both said airfoils to an extended position generally perpendicular to the slipstream and arranged to deflect an effective portion of the slipstream downwardly across said fuselage and adjacent the center of gravity thereof, and means inclusive of the mixture of an engine exhaust gas and compressed air stream directed to each wing tip and opposed discharge openings mounted adjacent each wing tip directed substantially perpendicularly to the roll axis of the airplane for counteracting torque and provide lateral stability during vertical take-off and landing movements and the transition through low air speed ranges.

4. A vertical take-off and landing convertible airplane comprising a passenger carrying fuselage having ground resting members arranged to hold the fuselage at rest in a generally horizontal position, an empennage mounted on the fuselage arranged for conventional flight, a long span airfoil mounted above the fuselage and arranged for conventional flight, engine means mounted on said airfoil and arranged to actuate a single tractor propeller, an upper stub airfoil and end plates supported by said airfoil in direct slipstream alignment, slipstream deflecting means inclusive of wing flaps depending downwardly and rearwardly from said airfoil and stub airfoil and arranged to move from a closed, conventional flight position where the slipstream passes generally aligned over both said airfoils to an extended position generally perpendicular to the slipstream and arranged to deflect an effective portion of the slipstream downwardly across said fuselage and adjacent the center of gravity thereof, and means inclusive of a high compressed air stream directed to each wing tip and opposed discharge openings mounted adjacent each wing tip directed substantially perpendicularly to the roll axis of the airplane and arranged for counteracting torque and provide lateral stability during vertical take-off and landing movements and the transition through low air speed ranges.

5. In a single propeller convertible airplane, at least one airfoil mounted for conventional flight, means supported by said airfoil for selectively deflecting the propeller slipstream from a generally horizontal to a generally vertical downwardly direction, means associated with an airplane engine for producing a high velocity stream of gas including an engine exhaust system and means for dividing at least a portion of the exhaust gases and directing them to duct means mounted in the airfoil extending from the airplane engine to each tip of the airfoil for directing said high velocity stream of gas, and opposed gas discharge means in each airfoil tip directed substantially perpendicularly to the roll axis of the airplane to substantially counteract the torque of the airplane engine.

6. In a single propeller convertible airplane, at least one airfoil mounted for conventional flight and, means supported by said airfoil for selectively deflecting the propeller slipstream from a generally horizontal to a generally vertical downwardly direction, the airplane being driven by a turbo-prop type engine, means for dividing the exhaust from said engine and directing it as a high velocity stream of gas into duct means mounted in the airfoil extending from the airplane engine to each tip of the airfoil for directing said high velocity stream of gas, and opposed gas discharge means in each airfoil tip directed substantially perpendicularly to the roll axis of the airplane to substantially counteract the torque of the airplane engine.

7. In a single propeller convertible airplane, at least one airfoil mounted for conventional flight and, means supported by said airfoil for selectively deflecting the propeller slipstream from a generally horizontal to a generally vertical downwardly direction, an air compressor mounted on and driven by the airplane engine, means for conducting air from said compressor and admixing it with engine exhaust to produce a stream of high velocity gas, duct means mounted in the airfoil extending from the airplane engine to each tip of the airfoil for directing said high velocity stream of gas, and opposed gas discharge means in each airfoil tip directed substantially perpendicularly to the roll axis of the airplane to substantially counteract the torque of the airplane engine.

References Cited in the file of this patent

UNITED STATES PATENTS

| | | |
|---|---|---|
| 2,406,923 | Stalker | Sept. 3, 1946 |
| 2,451,008 | Williams | Oct. 12, 1948 |
| 2,568,812 | Lee | Sept. 25, 1951 |
| 2,622,826 | Prince | Dec. 23, 1952 |
| 2,650,666 | Dorand et al. | Sept. 1, 1953 |
| 2,840,324 | Smith | June 24, 1958 |
| 2,848,180 | Ploger | Aug. 19, 1958 |

FOREIGN PATENTS

| | | |
|---|---|---|
| 502,903 | France | Mar. 3, 1920 |